(Specimens.)

J. HALEY.
ORNAMENTAL PRESSED GLASSWARE AND PROCESS OF MAKING THE SAME.

No. 341,141. Patented May 4, 1886.

Attest
Geo. F. Robinson
2 Cooley

Inventor
Jonathan Haley
By Bradford Howland
Attorney.

UNITED STATES PATENT OFFICE.

JONATHAN HALEY, OF RAVENNA, OHIO.

ORNAMENTAL PRESSED GLASSWARE AND PROCESS OF MAKING THE SAME.

SPECIFICATION forming part of Letters Patent No. 341,141, dated May 4, 1886.

Application filed July 15, 1885. Serial No. 171,659. (Specimens.)

*To all whom it may concern:*

Be it known that I, JONATHAN HALEY, of Ravenna, Portage county, Ohio, have invented a new and useful Improvement in Ornamental Pressed Glassware and in the Process for Making Same, of which the following is a specification.

My invention relates to colored glass-ware which has been pressed with indented figures, and then the color wholly or partially removed from the figures by heating.

Figure 1:
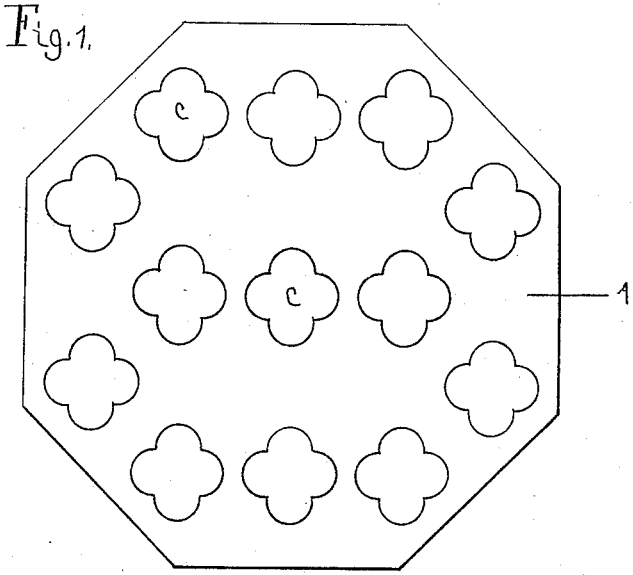
Figure 2:

In the drawings forming a part of this specification, Figure 1 represents a figured-glass plate, and Fig. 2 represents a cross-section of the same at line 1.

The thin part of the plate above the indented figures $c$ is nearly colorless or transparent, and the remainder or thicker part of the plate is of colored glass.

The plate is formed by pressing molten colored glass with deeply-indented figures $c$ on one side. The other side is then heated till the color is substantially removed from the thin part over the indented figures, while the part of the plate between the figures, being thicker, will retain most of its color.

The above-described process is especially adapted for making glass tiles, window-panes, and other articles. The figures $c$ should be so deeply indented that the glass of the bottom of the indentations will be sufficiently thin to resemble flint glass after being reheated. Some colors are more easily removed by reheating the glass than others, and it is therefore desirable that the kinds of glass should be used whose colors are the most susceptible to the effect of heat.

I claim as my invention—

1. Ornamental glassware formed of colored glass pressed with indentations or deep figures on one side, the indented parts or figures being substantially colorless and resembling flint glass by being made sufficiently thin and subjected to heat, substantially as and for the purpose described.

2. The process of making ornamental-pressed glassware, consisting of pressing molten colored glass with deep indentations or figures on one side, and then heating the opposite side until the thin parts or figures are nearly or quite colorless and resembling flint glass, substantially as described.

JONATHAN HALEY.

Witnesses:
BRADFORD HOWLAND,
GEO. F. ROBINSON.